UNITED STATES PATENT OFFICE.

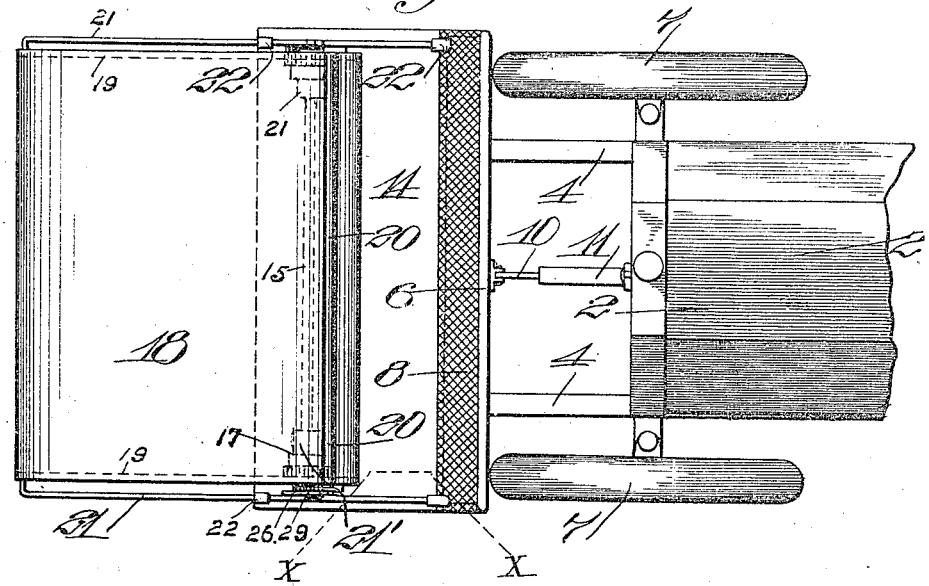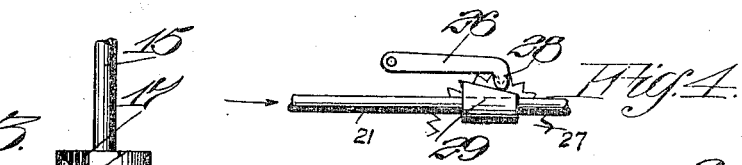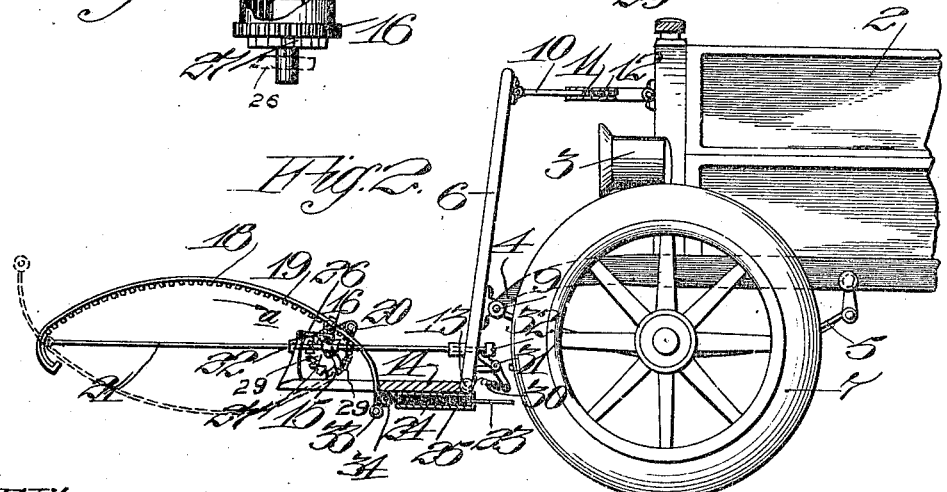

ARTIE L. RAVEN, OF VISTA GRANDE, CALIFORNIA.

AUTO-FENDER.

1,043,460.  Specification of Letters Patent.  Patented Nov. 5, 1912.

Application filed March 27, 1911, Serial No. 617,251. Renewed September 9, 1912. Serial No. 719,413.

*To all whom it may concern:*

Be it known that I, ARTIE L. RAVEN, citizen of the United States, residing at Vista Grande, in the county of San Mateo and State of California, have invented new and useful Improvements in Auto Fenders, of which the following is a specification.

This invention relates to fenders and particularly to fenders for vehicles.

The object of the present invention is to provide a device adapted to be mounted in front of vehicles, such as automobiles, whereby when the vehicle comes into juxtaposition with an object or person in the roadway, the fender is automatically set in operation and catches the object or person, so as to prevent their passing beneath the vehicle; also to provide a fender which may be folded upwardly into a compact position when desired.

The invention consists of the parts and the construction and combination of parts, as hereinafter more fully described and claimed, having reference to the accompanying drawings, in which—

Figure 1 is a plan view of the device as applied to an automobile. Fig. 2 is a side elevation of the same with parts in section, on the line X—X of Fig. 1. Fig. 3 is a detail of one of the driving drums, and Fig. 4 is a detail of the drum releasing device.

In the illustrated embodiment of my invention 2 represents a portion of an automobile supplied with lamps 3, and projecting forward of the hood of the automobile is a portion of the chassis 4, to which may be connected a spring 5.

The fender forming the essential portion of the present invention comprises a frame 6 of appropriate design and strength, preferably sufficiently wide to extend slightly beyond the side planes of the wheels 7 of the vehicle. Upon the frame 6 may be securely fastened a fabric or netting indicated at 8.
The frame 6 may be mounted in any appropriate manner on the vehicle and is shown as being pivoted at 9 to the front end of the chassis 4, and may also be connected to any convenient part of the vehicle by a cushioning device, comprising rod 10 telescopic in a sleeve 11, within which is an expansive spring 12 whereby the rod 10 may be projected outwardly. The screened frame 6 may be adjusted in a substantially vertical position in front of the vehicle, and at the lower horizontal edge of this frame is formed a pivot 13, on which may be mounted in suitable restraining supports 21' a foot or apron 14. Upon the apron 14 is mounted a transverse shaft 15, loosely supporting adjacent to its ends gears 16, to which are connected ends of powerful springs 17. These are effective to revolve the gears 16 whereby a suitably shaped and proportioned basket 18 is actuated.

The device or basket 18 is preferably constructed of some strong, slightly flexible material, such as iron or steel, and is provided on its end surfaces and adjacent to its edges with racks 19 forming an irregular curve corresponding to the curvature of the basket 18, which in cross section is substantially arcuate.

The racks 19 formed upon the lower surface of the basket 18 engage the upper teeth of the gears 16. For the purpose of constantly retaining the racks and gears in mesh, a longitudinally mounted roller 20 extends across the upper surface of the basket or pick-up device 18 and is mounted in end bearings 21', between which may move backwardly the basket 18.

The front longitudinal portion of the basket 18 is formed with a substantially hook-shaped portion and when the basket has been moved forwardly into the position shown in full lines in Fig. 2, a rod or frame 21 slidable in suitable bearings 22 provided on the apron 14 and the frame 6 is adapted to restrain the basket 18 in its upwardly and forwardly extended position against the tension of the springs 17 connected to and actuating the gears 16. One end of each spring 17 is connected to its respective gear and the other end to the stationary shaft 15 upon which the gears turn. When the basket 18 is pulled forwardly over the gears it winds the springs 17 about the shaft 15.

The normal direction of rotation of the gears 16 under the impulse of the springs 17 is such that, when permitted, the gears 16 revolve toward the right in Fig. 2, and, being in mesh with the racks 19, move the basket 18 rearwardly. The lower rear edge of this basket is provided with an antifriction device, as a roller 33, which may be permitted to travel on the ground when the basket 18 has been projected rearwardly and downwardly with sufficient rapidity.

For the purpose of normally advancing the rear end of the basket 18, upon which is mounted the roller 33, there is provided a roller 34 mounted upon the end of a rod 23 guided in a suitable bearing 24 attached to the apron 14; and mounted within the bearing 24 and surrounding the rod 23 is a strong spring 25 effective to thrust the roller 34 forwardly when the basket 18 has been permitted to move.

When the restraining rod 21 has been moved forwardly to sustain the basket 18 in the full line position shown in Fig. 2, pawls 26 pivoted on the apron 14 engage respective ratchet wheels 27 fixed to each of the gears 16. Each of the pawls 26 is provided with a point 28 resting upon respective cams 29 secured upon the rearwardly extending portions of the retaining device 21. When the forward, downwardly curved edge of the basket 18 encounters an obstruction in the roadway, the member 21 is moved slightly backward, due to the spring of the basket 18, and this slight backward movement of the device 21 is effective through the cams 29 to lift the pawls 26 sufficiently to carry them out of register with their respective ratchet wheels 27; the latter, being released, permit the gears 16 to be rapidly revolved by their respective springs 17. When thus released, the basket 18 is rapidly moved in the direction indicated by the arrow a, Fig. 2, and then the roller 34 becomes effective to move forward the antifriction roller 33 attached to the rear depending portion of the basket 18.

The combined forces, due to the action of the spring 25 and the springs 17, effective through the gears 16, cause the roller 33 to move slightly downward and forward to pick up any object which might happen to have fallen beneath the apron 14; and the motion of the basket 18 is continued until it is carried to the position indicated in dotted lines in Fig. 2.

It is desirable that the restraining device 21 be automatically withdrawn rearwardly when the basket 18 is released for operation, and this rearward withdrawal of the device 21 is accomplished by means of springs 30 connected to levers 31 pivoted on the rear side of the frame 6, which levers are adapted to engage collars 32 secured on the rear ends of the restraining device 21.

The levers 31 do not become effective to recede the device 21 until the latter has moved sufficiently rearward to release the restraining pawls 26, after which movement the levers 31 swing about their pivots so that the upper ends of the levers will engage the end faces of the collars 32, and the force of the springs 30 will be effective to slide backwardly the frame 21.

Having thus described my invention, what I claim and desire to secure by Letters Patent is—

1. A fender for vehicles comprising a substantially vertical screen, means for connecting said screen to the vehicle, a substantially horizontal apron pivoted to the lower end of the aforesaid screen, a lifting device mounted upon said apron, and means for automatically moving said lifting device so as to permit it to move in a sweeping path to pick up objects in front of the vehicle.

2. A fender for vehicles comprising a substantially vertical screen, means for connecting said screen to the vehicle, a substantially horizontal apron pivoted to the lower end of the aforesaid screen, a lifting device mounted upon said apron, means for automatically moving said lifting device so as to permit it to move in a sweeping path to pick up objects in front of the vehicle, said actuating means comprising gears meshing with racks attached to the lower surface of the lifting device, and springs effective to rotate said gears.

3. A fender for vehicles comprising a substantially vertical screen, means for connecting said screen to the vehicle, a substantially horizontal apron pivoted to the lower end of the aforesaid screen, a lifting device mounted upon said apron, means for automatically moving said lifting device so as to permit it to move in a sweeping path to pick up objects in front of the vehicle, said actuating means comprising gears meshing with racks attached to the lower surface of the lifting device, springs effective to rotate said gears, and means whereby the actuating gears may be restrained.

4. A fender for vehicles comprising a substantially vertical screen, means for connecting said screen to the vehicle, a substantially horizontal apron pivoted to the lower end of the aforesaid screen, a lifting device mounted upon said apron, means for automatically moving said lifting device so as to permit it to move in a sweeping path to pick up objects in front of the vehicle, said actuating means comprising gears meshing with racks attached to the lower surface of the lifting device, springs effective to rotate said gears, and means whereby the actuating gears may be restrained, said means including a frame slidably mounted upon the apron having cams adapted to release pawls engaging said gears.

5. A fender for vehicles comprising a substantially vertical screen, means for connecting said screen to the vehicle, a substantially horizontal apron pivoted to the lower end of the aforesaid screen, a lifting device mounted upon said apron, means for automatically moving said lifting device so as to permit it to move in a sweeping path to pick up objects in front of the vehicle, said actuating means comprising gears meshing with racks attached to the lower surface of the lifting device, springs effective to rotate said gears, means whereby the actuating gears may be restrained, said means including a frame slidably mounted upon the apron having cams adapted to release pawls engaging said gears, and an instrumentality for rearwardly moving the restraining frame, said instrumentality including rollers secured upon said frame, levers engageable with said rollers and springs for actuating said levers.

In testimony whereof I have hereunto set my hand in the presence of two subscribing witnesses.

ARTIE L. RAVEN.

Witnesses:
G. H. STRONG,
E. E. SMITH.